No. 642,349. Patented Jan. 30, 1900.
W. E. MARTIN.
IMPLEMENT FOR CULTIVATING LAND.
(Application filed June 12, 1899.)
(No Model.) 6 Sheets—Sheet 2.
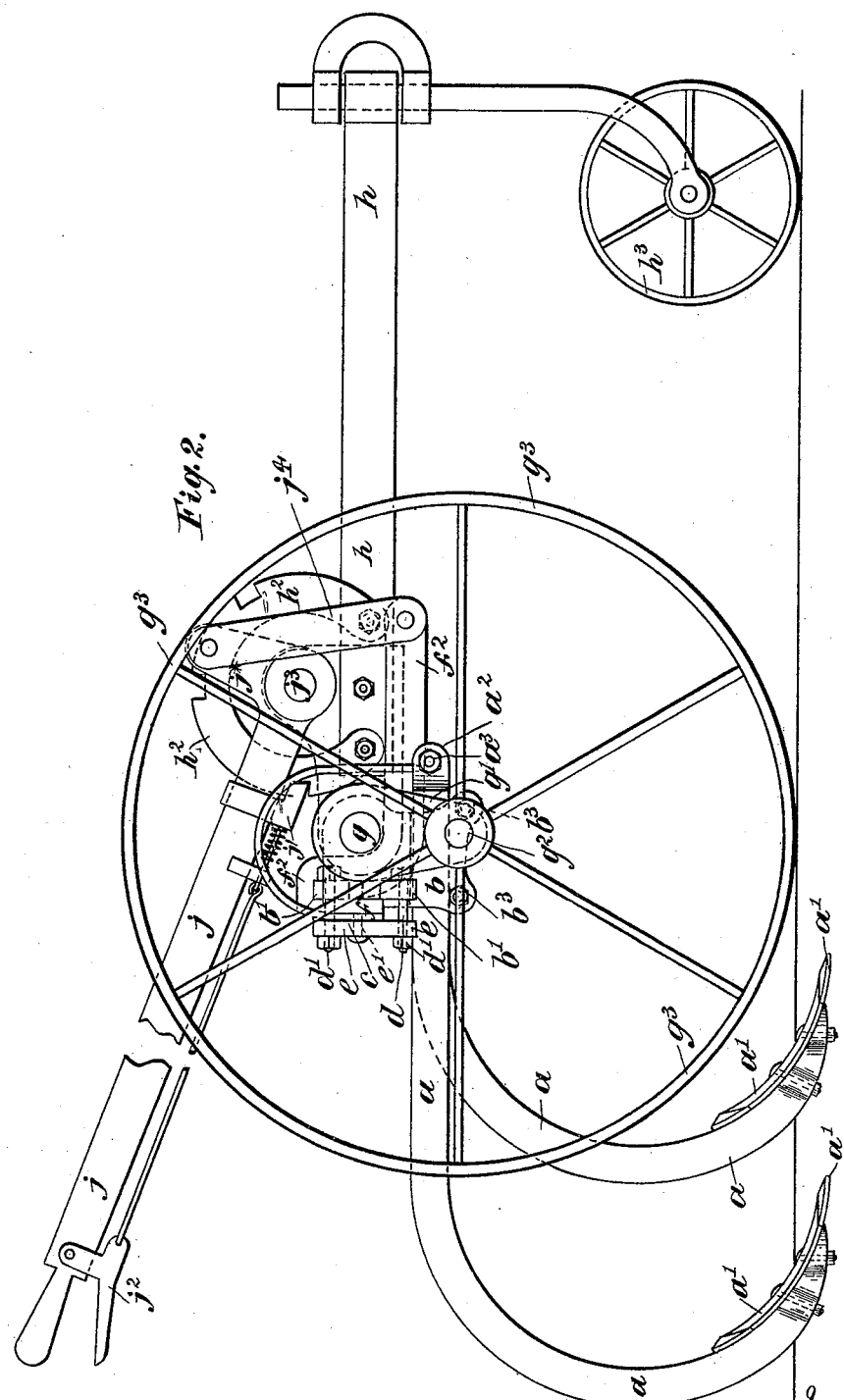

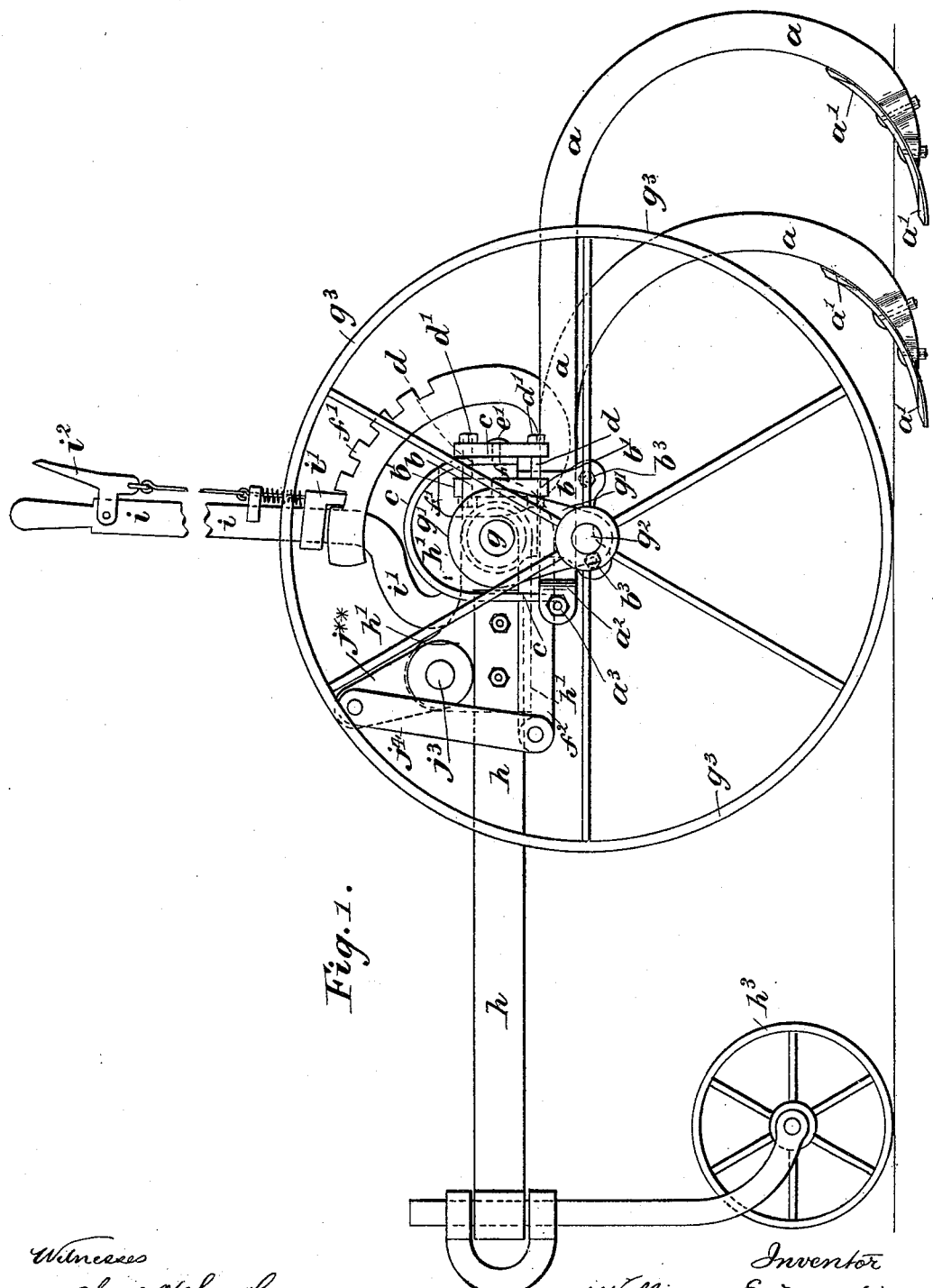

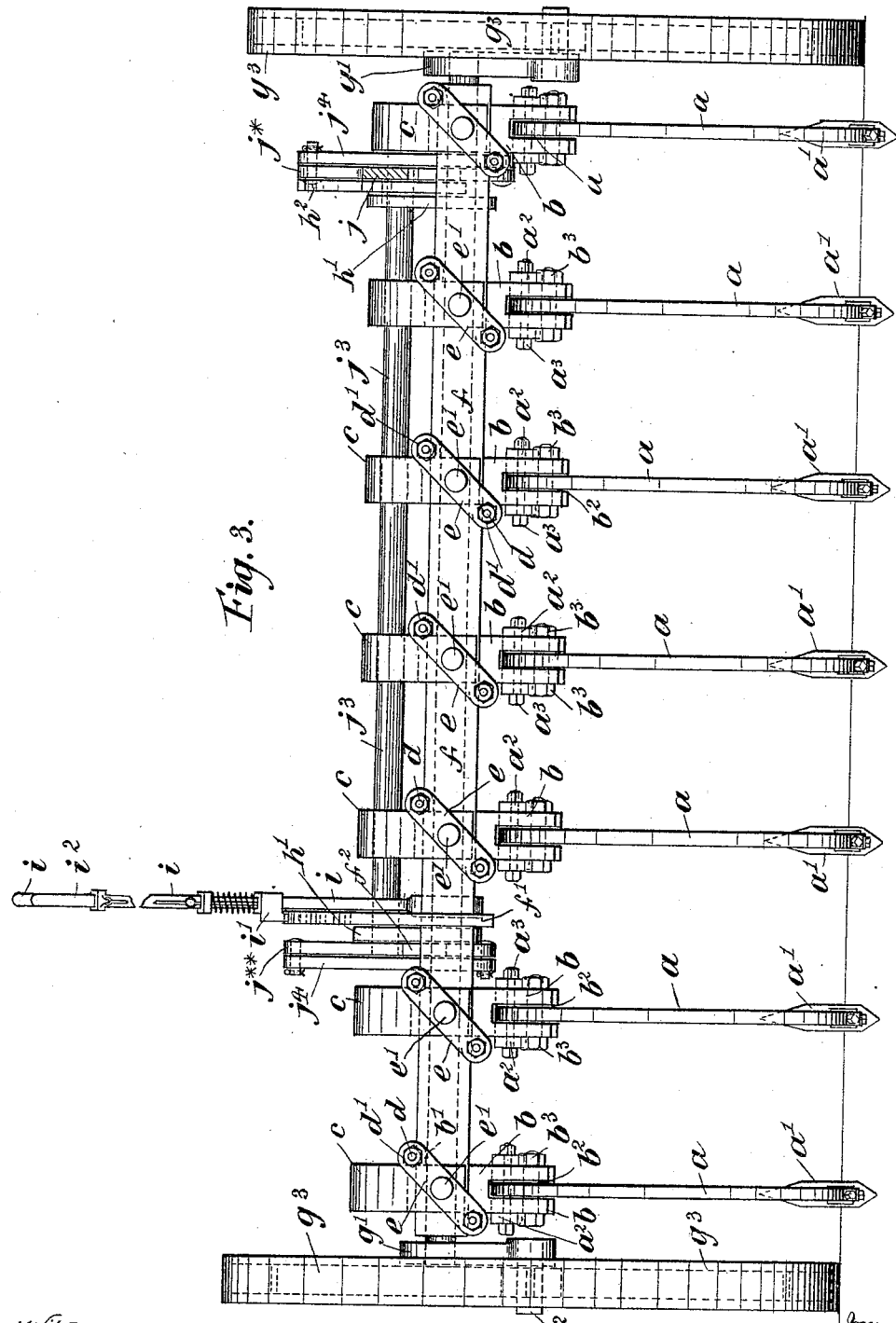

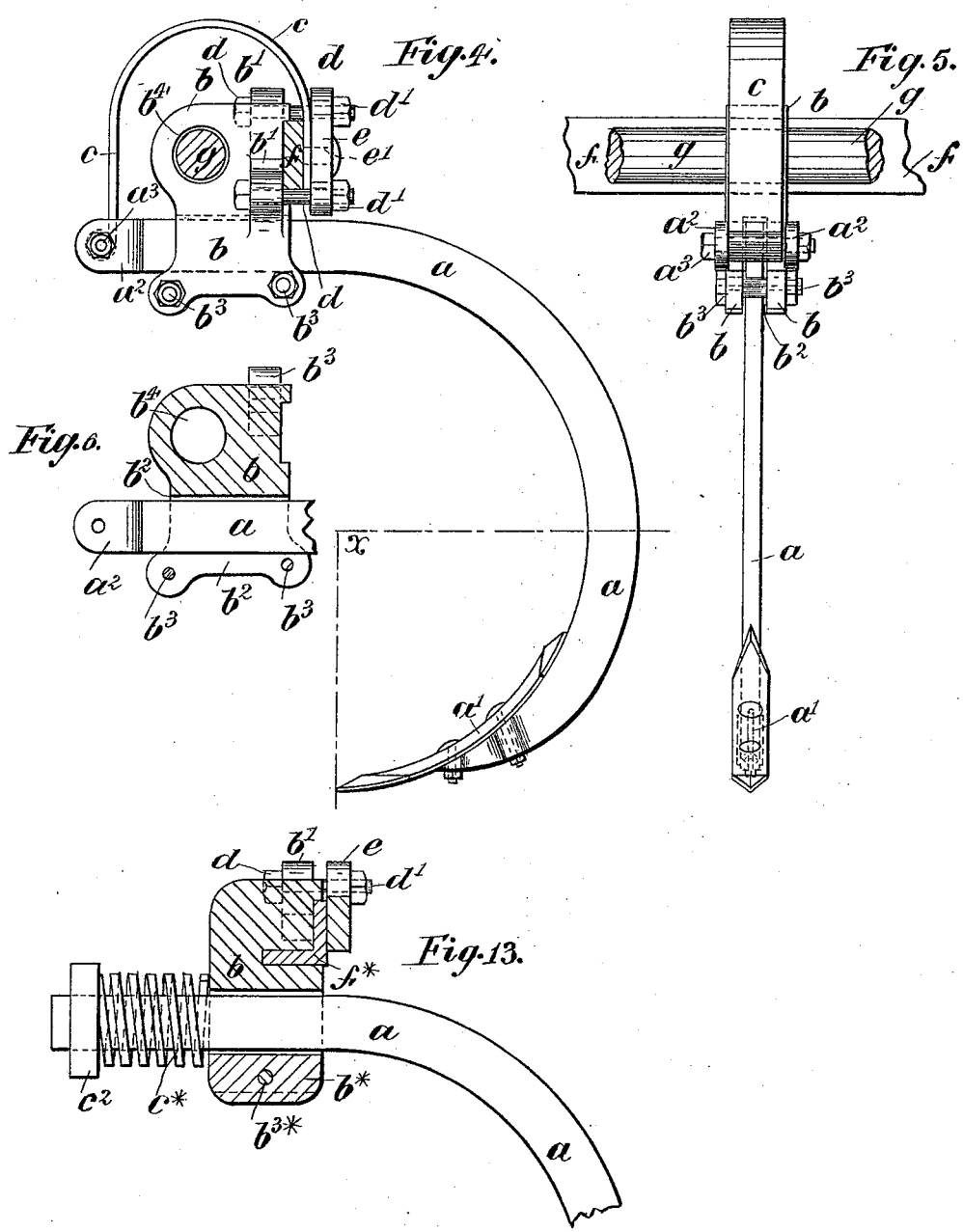

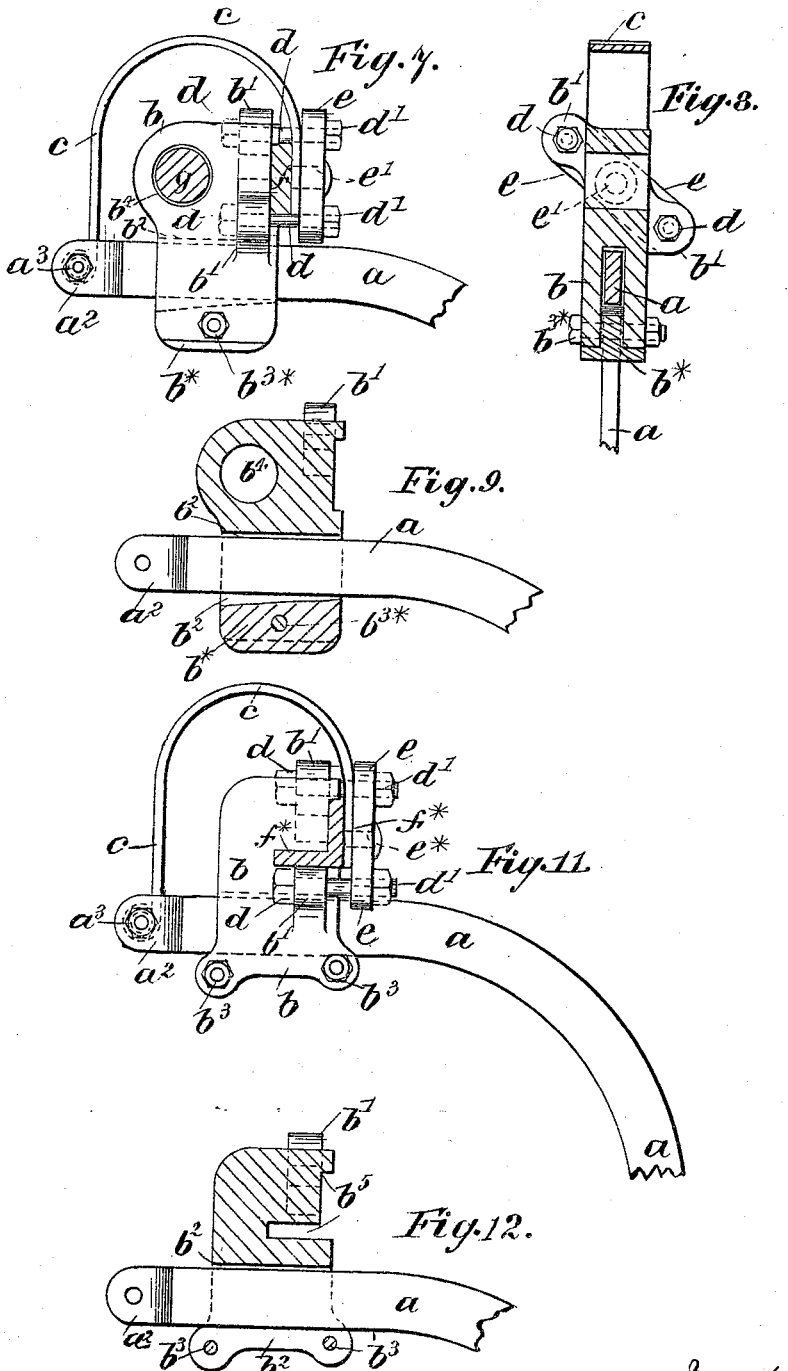

No. 642,349. Patented Jan. 30, 1900.
W. E. MARTIN.
IMPLEMENT FOR CULTIVATING LAND.
(Application filed June 12, 1899.)
(No Model.) 6 Sheets—Sheet 6.
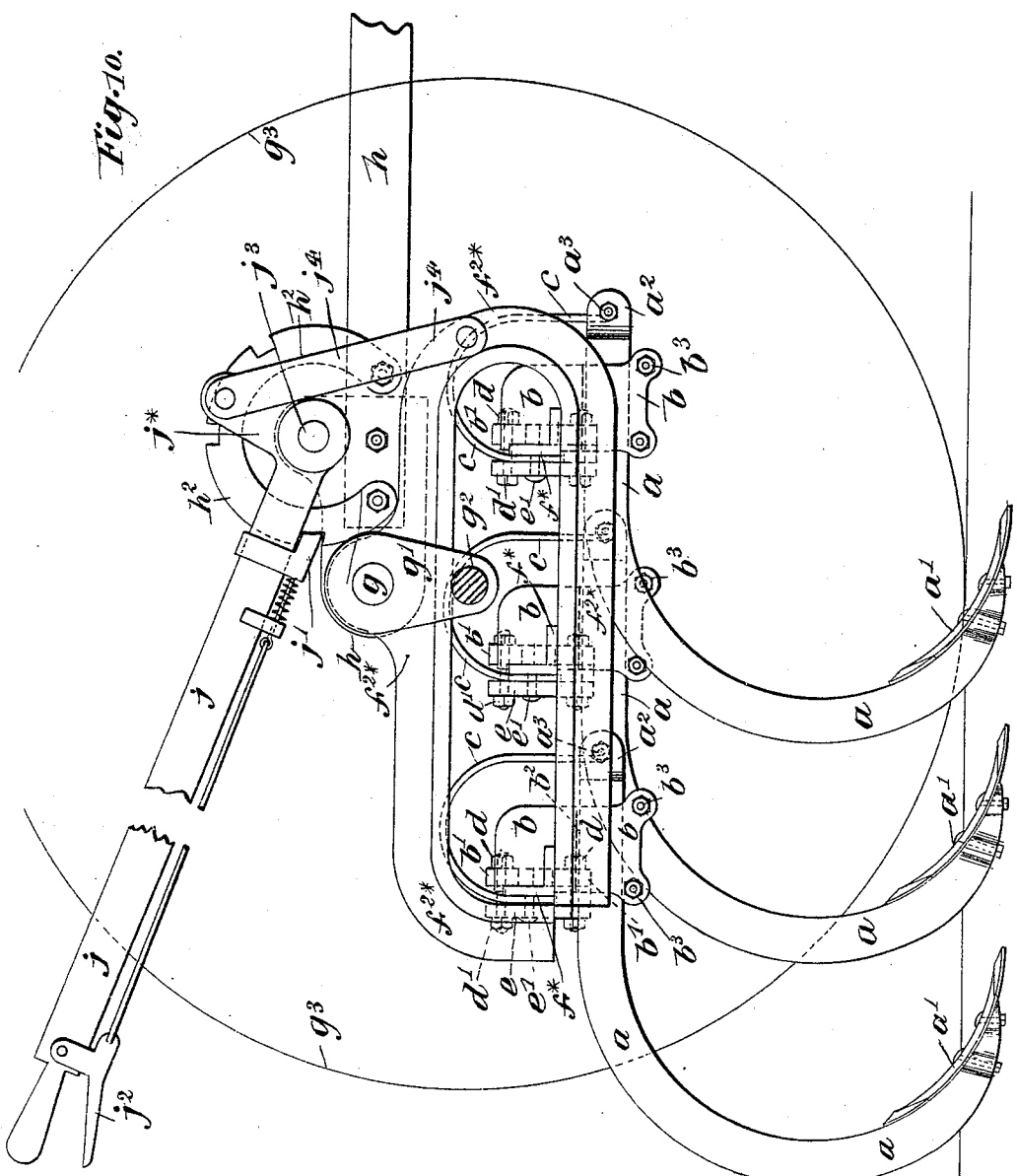
Witnesses
Chas H Smith
J. Staib
Inventor
William E. Martin
per L. W. Serrell & Son
Attys.

UNITED STATES PATENT OFFICE.

WILLIAM E. MARTIN, OF ABBOTTS RIPTON, ENGLAND.

IMPLEMENT FOR CULTIVATING LAND.

SPECIFICATION forming part of Letters Patent No. 642,349, dated January 30, 1900.

Application filed June 12, 1899. Serial No. 720,146. (No model.)

*To all whom it may concern:*

Be it known that I, WILLIAM EDWARD MARTIN, a subject of the Queen of Great Britain, residing at Abbotts Ripton, in the county of Huntingdon, England, have invented certain new and useful Improvements in Implements for the Cultivation of Land, of which the following is a full, clear, and exact description, and for which I have made application for patent in Great Britain, numbered 25,031, dated November 28, 1898.

The invention relates mainly to land-cultivating implements for horse or mechanical power having shanks to which are attached cultivating-blades capable of movement and controlled by springs; and it consists of certain improvements connected therewith, as follows: First, I connect the shanks in a suitable manner to springs, so that they will vibrate in work, but not pull back too far or raise the shanks and their cultivating-blades out of the ground; secondly, I construct the shanks so that the cultivating-blades thereof will more readily enter and lift the soil and bring weeds and rubbish to the surface, and, thirdly, I provide means whereby all the shanks and their cultivating-blades can be readily, quickly, and evenly adjusted to the desired working depth.

The well-known types of these implements have shanks which present the cultivating-blades at too great an angle for effective work or pull back and come onto or near the surface. This difficulty I have entirely overcome by my invention, which consists of shanks made of metal of rectangular or other suitable section bent to an improved sickle shape and having either forged or renewable cultivating-blades. The front or upper ends of these shanks pass through and are free to move in slots in guide-blocks carried by the machine and terminate in forks or other suitable device by which they are jointed securely to one end of U-shaped springs, the other ends of said springs being rigidly fixed to the guide-blocks or to the frame, so that when the machine is at work these springs will keep the shanks and cultivating-blades in a continual state of vibration, and if they should encounter a very hard piece of ground or obstruction the springs can only be compressed to the guide-blocks, in which case the shanks would then be practically solid and so keep to the work.

In order that my invention may be clearly understood and readily carried into effect, I will proceed, aided by the accompanying drawings, fully to describe the same.

Figures 1 and 2 are two opposite side elevations of one form of my improved cultivator. Fig. 1 merely shows an elevation of half the machine, and Fig. 2 shows an elevation of the other half of the machine to the central line. These figures have been shown in this way for the sake of clearness. Fig. 3 is a rear elevation of the same. Fig. 4 is a sectional side elevation, and Fig. 5 is a front view showing one of the shanks with its guide-block and spring connection and cultivating-blade. Fig. 6 is a longitudinal section through the guide-block shown at Figs. 4 and 5. Figs. 7, 8, and 9 are corresponding views to Figs. 4, 5, and 6, showing a slight modification in the construction of the guide-block. Fig. 10 is a side elevation of a slightly-modified form of my improved cultivator in which three sets of shanks are arranged to work in different cross planes. Fig. 11 is a sectional elevation showing one of the shanks shown in Fig. 10, with its guide-block and spring connection. Fig. 12 is a longitudinal section of the guiding-block shown in Fig. 11, showing the shank in position therein; and Fig. 13 is a longitudinal section through a guide-block, showing a shank in position therein fitted with a different form of spring.

In all the figures like parts are indicated by similar letters of reference.

I will first describe the form of machine shown at Figs. 1 to 6.

$a$ are the shanks, which in the various views are shown fitted with reversible steel cultivating-blades $a'$. The upper ends of these shanks pass through guide-blocks $b$ and are free to move therein, and they terminate in forks $a^2$.

$c$ are U-shaped springs which at one end are secured rigidly to the guide-blocks $b$ in any convenient manner, the following arrangement being shown in the drawings; Lugs $b'$ are formed on opposite sides of each block $b$. Bolts $d$ are passed through these lugs and through a plate $e$. This plate $e$ has a pin $e'$ fitting a hole in one end of the U-shaped spring $c$, and the latter is bolted securely to the guide-block $b$, and both it and the guide-block are secured to the cross-bar or carrier $f$ by nuts $d'$, screwed onto the bolts $d$. The other ends of these U-shaped springs $c$ are connected to the forked ends $a^2$ of the shanks by means of a bolt $a^3$, so as to form a joint.

Each of the blocks $b$ is formed with a slotted opening $b^2$ in its lower part, within which the shank is located, and the latter is retained within said slot by means of cross-bolts $b^3$. The slot in the block $b$ is preferably made deeper at the front than the depth of the shank, as shown in Figs. 4 to 12. Thus when the shanks $a$ are in work they will be kept in a continual state of vibration, and should they meet with a hard piece of land or other obstruction the springs $c$ can only be compressed until the forks $a^2$ come into contact with the guide-blocks $b$, when the shanks will act as non-yielding shanks until the obstruction is passed. They will then spring back to their normal position. It will be understood that the shanks act independently of each other, so that some might act as unyielding shanks, while others are free to yield.

Passing through holes $b^4$ in the guide-blocks $b$ is a shaft $g$, on the ends of which are fixed cranks $g'$, provided with pins $g^2$, on which the ground or supporting wheels $g^3$ are mounted. This shaft $g$ is mounted in journals formed in brackets $h'$, fixed to and forming part of the frame $h$. A lever $i$ is also secured to the shaft $g$. This lever is fitted with a spring-pawl $i'$, operated by a hand-lever $i^2$, and said pawl is capable of being engaged with any of the notches of the quadrant $f'$, which latter is fixed rigidly to the bar or carrier $f$. By these means the angle of the cranks $g'$, and consequently the height of the rear part of the frame $h$, can be varied, thereby enabling all the shanks and their cultivating-blades to be regulated to an equal working depth, whereas in other systems of cultivator, with a fixed wheel-center and adjustment obtained by a lever and quadrant, the back row of shanks and their cultivating-blades must be either deeper or more shallow in the work than the more forward row or rows except at one fixed depth.

A lever $j$, provided with a spring-pawl $j'$, operated by a hand-lever $j^2$, is fixed on one end of a shaft $j^3$, and said lever is capable of being moved so that its spring-pawl may engage with any of the notches in the quadrant $h^2$, fixed to the frame $h$. This lever $j$ has a short arm $j^*$, which by a link $j^4$ is connected to a bracket $f^2$, fixed to the bar $f$. On the opposite end of the shaft $j^3$ is fixed an arm $j^{**}$, corresponding with the arm $j^*$, and said arm $j^{**}$ is connected by a second link $j^4$ to a second bracket $f^2$, fixed to the bar $f$. By these means the shanks and their cultivating-blades can be set in the desired position for work or lifted clear of the ground for the better convenience of turning, traveling on roads, or clearing of rubbish.

If desired, the machine may be provided with a seat supported in any convenient manner on the frame, thereby enabling the machine to be better under the control of one man. I have not, however, shown a seat in the drawings in order to avoid confusion; but such can be readily fitted by any competent mechanic.

The front of the frame $h$ is shown provided with a swivel-wheel $h^3$; but this may be dispensed with and a pole or shafts may be attached to the frame $h$.

The machine above described has two rows of shanks $a$, the carrying-blocks $b$ of which are all secured to the same bar or carrier $f$, while the distance between the front and back rows is obtained by giving the back row a greater length of shank than the front row.

In the modified form of block $b$ shown at Figs. 7, 8, and 9 the bottom of the opening for the shank in the guide-block is closed by a closing-plate $b^*$, held in position by a bolt $b^{3*}$.

I will now describe the modifications shown at Figs. 10, 11, and 12. In this form of my improved machine I employ three rows of shanks $a$, all of which have their shanks of the same length; but each row of shanks $a$ and springs $c$ is attached to a separate angle-iron bar $f^*$, and the ends of these bars $f^*$ are fixed to a pair of frames or carriers $f^{2*}$, mounted on the shaft $g$. A lever $j$, spring-pawl $j'$, hand-lever $j^2$, arms $j^* j^{**}$, link $j^9$, and quadrant $h^2$ are employed to enable the frames or carriers $f^{2*}$ to be moved around the shaft $g$ and fixed to place the shanks in position for work or to raise them free of the ground, and the depth of the shanks and their cultivating-blades in the ground may be regulated, as fully described with reference to the arrangement shown at Figs. 1 to 6.

In the arrangement shown at Fig. 10 the blocks $b$ are constructed as shown at Figs. 11 and 12—that is to say, they have a recess $b^5$ to fit onto the bar $f^*$, and the springs $c$ are secured to the bar $f^*$ by bolts and nuts $d$ $d'$ and a plate $e$, as hereinbefore described. The blocks $b$ (shown in Figs. 10, 11, and 12) may have their shank-openings closed by bolts $b^3$ $b^3$, as shown, or by a closing-plate $b^*$, as shown in Figs. 7, 8, and 9. The advancing edges of the shanks $a$ may be sharpened above the cultivating-blades instead of being blunt, as shown, and the ends of the cultivating-blades are also beveled or pointed, so that the said parts will offer as little resistance as possible in work. I may also make the shanks of any suitable shape or section, and, as represented at Fig. 13, I may in lieu of the flat U-shaped springs $c$ substitute coiled springs $c^*$, placed around the shanks between collars $c^2$ thereon and the front of the blocks $b$. I construct the shanks $a$ of such shape that the working points of the cultivating-blades $a'$ shall be substantially perpendicularly below the center $x$ from which the curve of the shank or working part thereof is struck, whereby I obtain a cutting action in contradistinction to the dragging action produced when the points of the cultivating-blades are not continued so far forward.

The pattern of the guide-blocks $b$ may be altered from those herein shown and described, and they may be secured to the frame by other means than those illustrated.

I do not confine myself to the particular shape of the springs herein shown and described, and I may connect the springs to the frame or to the shanks and guide-blocks in any suitable manner other than those herein described and illustrated.

I do not limit myself to the use of the shapes of frame herein described and illustrated, such being only shown as a type to which my invention refers; but I may make modifications and adapt my invention to other pattern cultivator, scarifier, drag-harrow, or the like.

What I claim as my invention, and desire to secure by Letters Patent, is—

1. In a cultivator, the combination with the shanks, of cultivating-blades secured to the lower ends of the shanks, guide-blocks having slots therein and fitting the shanks, and springs attached directly to the shanks and acting upon the same in a horizontal direction, the shanks and their cultivating-blades being non-yielding when the springs are compressed until the ends of the shanks come into contact with the guide-blocks, substantially as set forth.

2. In a cultivator, the combination with the shanks, of cultivating-blades attached to the lower ends of the shanks and guide-blocks having slots therein deeper at their front ends than at their rear ends where they fit the shanks, substantially as set forth.

3. In a cultivator, the combination with the shanks, of cultivating-blades secured to the lower ends of the shanks, guide-blocks having slots therein deeper at their front ends than at their rear ends where they fit the shanks, and springs acting in a horizontal direction upon the shanks, substantially as set forth.

4. In a cultivator, the combination with the shanks, of cultivating-blades secured to the lower ends of the shanks, the cultivating-blades having their upper surfaces beveled at the ends and their points substantially perpendicular below the center from which the curve of the shank is struck, guide-blocks in which the shanks are capable of horizontal and slightly-angular motion, springs acting in a horizontal direction on the shanks, means for adjusting the working depth of the shanks and their cultivating-blades and keeping them at all depths in a horizontal plane, and means for tilting the shanks and their cultivating-blades entirely out of the ground when required, substantially as set forth.

5. In a cultivator, the combination with the shanks, of cultivating-blades attached to the lower ends of the shanks, guide-blocks having slots deeper at their front ends than at their rear ends in which the shanks are mounted, springs acting upon said shanks, a bar or carrier carrying said guide-blocks and springs, a shaft carried by the machine-frame and from which such bar or carrier is supported, cranks fixed on the ends of the said shaft, pins on said cranks on which the carrying-wheels are mounted, a hand-lever fixed on said shaft to enable the angle of the cranks and consequently the working depth of the shanks and their cutting-blades to be adjusted, and a notched quadrant to receive the spring-pawl and thereby retain the parts in any required position, substantially as herein set forth.

In testimony whereof I affix my signature in presence of two witnesses.

W. E. MARTIN.

Witnesses:
   VALENTINE STAPLETON,
   HUGH PEACOCK.